A. W. MOCKRIDGE.
GAS CONDENSER.
APPLICATION FILED FEB. 6, 1905.
934,617.
Patented Sept. 21, 1909.
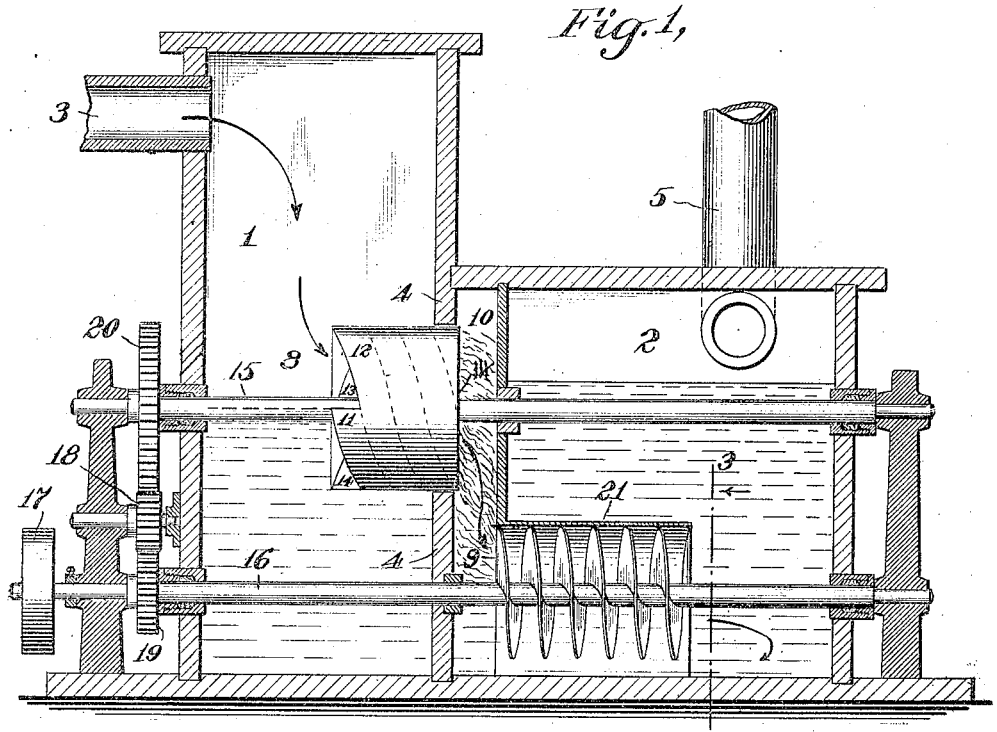
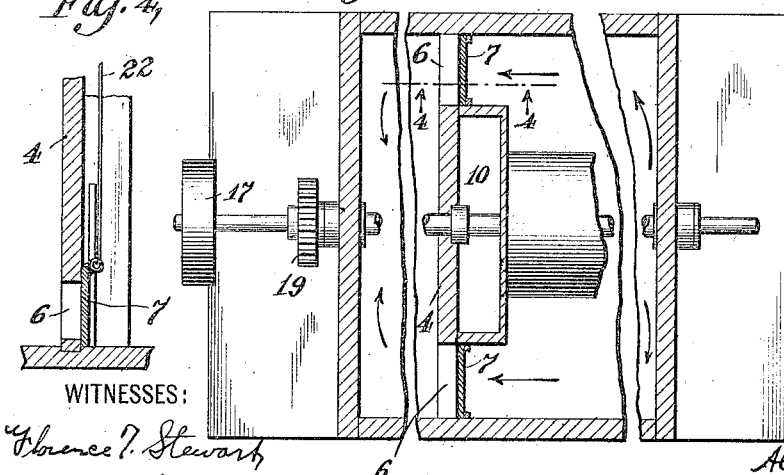
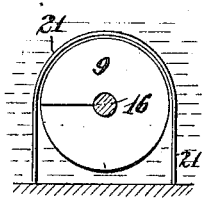
WITNESSES:
Florence T. Stewart,
John G. Hoover.
INVENTOR
Albert W. Mockridge
BY
Starr Cruser Scherer
his ATTORNEYS

UNITED STATES PATENT OFFICE.

ALBERT W. MOCKRIDGE, OF JERSEY CITY, NEW JERSEY.

GAS-CONDENSER.

934,617.   Specification of Letters Patent.   Patented Sept. 21, 1909.

Application filed February 6, 1905.   Serial No. 244,254.

*To all whom it may concern:*

Be it known that I, ALBERT W. MOCKRIDGE, a citizen of the United States, and a resident of Jersey City, county of Hudson, and State of New Jersey, have invented certain new and useful Improvements in Gas-Condensers, of which the following is a specification.

The object of my improvements is to provide an apparatus for condensing or consuming smoke, fumes, gases, vapors and the like, either for the purpose of rendering them inocuous or for divers manufacturing purposes, as, for example, forming solutions of gases or vapors; my apparatus being characterized by the features that it is simple of construction, cheap to build, inexpensive to operate, and highly efficient in action.

One embodiment of my improvements is illustrated in the accompanying drawings, wherein—

Figure 1 is a longitudinal vertical section through an apparatus provided with my improvements, some of the parts being shown in elevation; Fig. 2 a plan view of Fig. 1, partly in section, and partly in elevation, and showing portions broken away; Fig. 3 a section through 3—3 in Fig. 1, showing parts in elevation; and Fig. 4, a vertical section through 4—4 in Fig. 2.

Describing now my improvements as illustrated in the drawings; the apparatus shown comprises an inlet chamber 1 and an outlet chamber 2; the inlet chamber communicating at 3 with a chimney, smelting furnace or other source of smoke, fumes or gases; this being the chamber in the apparatus which first receives said gaseous products. The outlet chamber is separated from the inlet chamber by a partition 4, and receives the gaseous products after they have been treated by passing through the apparatus hereinafter to be described, intermediate said chambers. From this outlet chamber any non-condensable gases are delivered through the pipe 5, either into the air or elsewhere as desired. The inlet and the outlet chambers are adapted to hold liquid, and communicate with each other below the liquid level through openings 6 in the partition 4. Adjustable closing means may be provided for these openings in the form of movable gates 7. The inlet and outlet tanks further communicate with each other by means of the screw conveyers 8 and 9 and by the conduit 10 connecting said conveyers. The first conveyer 8 may be described as comprising a plurality of helical or tortuous passages, 11, 12, 13 and 14, coiled around shaft 15, and rotatable therewith; said passages being open at both ends, the openings at the front end of the conveyer forming mouths or scoops which, as the conveyer rotates scoop up or entrap liquid and gases, and deliver same by screw action through the conveyer, and out of its rear or exit end. This conveyer 8 is rotatably mounted in the inlet chamber 1 in partially submerged position, and is arranged with its exit, or delivery end, projecting through a suitable circular opening in the partition 4.

The second conveyer 9 is rotatably mounted in the outlet chamber 2 so as to be submerged, and is connected with the first conveyer through the closed box or conduit 10. This conveyer 9 may be either of the same construction as conveyer 8, excepting that it will preferably be of smaller diameter and have longer helical passages, or it may take the form shown of an Archimedean screw in which the screw is mounted on the shaft 16 and rotates inside the stationary casing 21.

Any suitable means may be provided for rotating the respective conveyers. In this instance they are geared together so as to be both driven by the same pulley 17, an intermediate gear 18 being provided between gears 19 and 20 on the shafts 16 and 15, respectively, to cause the conveyers to rotate in the same direction.

The action of the apparatus is as follows:—The inlet and the outlet chambers having been filled with water, or other liquid suitable for the particular purpose, to about the level of the shaft 15 of the upper conveyer, and the said conveyers having been put in motion, the smoke, fumes or other gaseous material will be sucked into the inlet chamber 1, and, along with quantities of liquid, will be delivered by the first conveyer 8 into the conduit 10, which in turn will convey the discharge downward into the mouth of the submerged conveyer 9, which by its rotation will deliver the combined liquid and gases into the outlet chamber 2, any uncondensed gases passing upward and off through the pipe 5, and the liquid circulating, as shown by the arrows in Fig. 2, back into the inlet chamber through the openings 6 in the partition. The liquid and gases in transit through the first conveyer are subjected to a more or less intimate commingling, which is perfected by their transit through the second conveyer, due not only to the greater length of the helical passages in said conveyer but also to the fact that the action takes place under pressure due to the weight of the superimposed liquid. The ultimate result is that there is a most effective extraction of the ingredients of the smoke, fumes, gases or vapors either in the form of insoluble matter or in the form of a solution.

It should be stated that by regulating the relative speeds of rotation of the respective conveyers, and by adjusting the flow of liquid from the outlet chamber back into the inlet chamber by the manipulation of the gates 7, the level of the liquid in said outlet tank may be controlled, and the degree of pressure due to the superimposed liquid upon the gases in the submerged conveyer, can therefore be regulated.

Having thus described my invention what I claim is:—

1. In an apparatus of the class described, the combination of a tank containing liquid; a device having a helical passage with entrance and exit openings, and rotatably mounted in a wholly submerged position in said tank; a conduit communicating with the entrance opening of said helical passage and leading above the surface of the liquid; and means adapted to feed liquids and gases through said conduit into said helical passage.

2. In an apparatus of the class described, a conduit; a device having a helical passage rotatably mounted in said conduit; means adapted to feed liquids and gases into said conduit upon said device with the helical passage; and a liquid holding chamber adapted to receive the liquid delivered by the device with the helical passage and return same to the action of the aforesaid means for feeding liquids and gases into the conduit upon the device with the helical passage.

3. In an apparatus of the class described, the combination of a tank containing liquid; a device provided with a helical passage having entrance and exit openings and rotatably mounted in a wholly submerged position in said tank; a conduit connecting with the entrance opening of said helical passage and leading above the surface of the liquid; and means for delivering liquids and gases down said conduit into said entrance opening of the helical passage, comprising a device provided with a helical passage and rotatably mounted in partially submerged position in said tank and communicating with said conduit.

4. In an apparatus of the class described, the combination of an inlet chamber containing liquid and adapted to receive the gases to be condensed; an outlet chamber likewise containing liquid; a communication between said chambers for the circulation of the liquid; a screw conveyer rotatably mounted partially below the liquid level in the inlet chamber; a second screw conveyer rotatably mounted wholly below the liquid level in the outlet chamber; and a conduit delivering the discharge from the first conveyer into the second.

5. In an apparatus of the class described, the combination of a tank containing liquid; a partition in said tank dividing same above the liquid level into two chambers; a screw conveyer rotatably mounted and partially submerged in one of the tank-chambers, and having its delivery end projecting through an opening in the partition; a conduit leading from the delivery end of said conveyer to the mouth of a second conveyer; and said second conveyer rotatably mounted in wholly submerged position in the other tank-chamber.

6. In an apparatus of the class described, the combination of a screw conveyer rotatably mounted, partially submerged in a liquid; another conveyer rotatably mounted, wholly submerged in a liquid; and means adapted to convey the liquid and gaseous discharge of the first conveyer into the second conveyer.

In witness whereof, I have signed my name to the foregoing specification in the presence of two subscribing witnesses.

ALBERT W. MOCKRIDGE.

Witnesses:
E. W. SCHERR, Jr.,
JOHN G. HONEY.